(12) United States Patent
Dänekas et al.

(10) Patent No.: US 7,150,842 B2
(45) Date of Patent: Dec. 19, 2006

(54) METHOD OF EXTRUDING A MIXTURE

(75) Inventors: Franz Dänekas, Garbsen (DE); Dirk Köhler, Edemissen (DE)

(73) Assignee: Nexans, Paris (FR)

( * ) Notice: Subject to any disclaimer, the term of this patent is extended or adjusted under 35 U.S.C. 154(b) by 168 days.

(21) Appl. No.: 10/671,768

(22) Filed: Sep. 29, 2003

(65) Prior Publication Data
US 2004/0094854 A1    May 20, 2004

(30) Foreign Application Priority Data
Nov. 14, 2002 (DE) .............................. 102 52 976

(51) Int. Cl.
*B29C 47/84* (2006.01)
(52) U.S. Cl. .............................. 264/40.6; 264/211.21; 264/211.24
(58) Field of Classification Search ...................... None
See application file for complete search history.

(56) References Cited

U.S. PATENT DOCUMENTS

| | | | |
|---|---|---|---|
| 3,331,100 A * | 7/1967 | Gould ...................... 425/379.1 |
| 3,805,888 A | 4/1974 | Dettmer |
| 4,161,419 A * | 7/1979 | Alia ............................ 156/51 |
| 4,355,905 A * | 10/1982 | St. Louis et al. .............. 366/79 |
| 4,462,691 A * | 7/1984 | Boguslawski ................. 366/80 |
| 4,528,155 A * | 7/1985 | Elder ..................... 264/171.19 |
| 4,569,595 A * | 2/1986 | Maillefer ...................... 366/88 |
| 5,256,482 A * | 10/1993 | Yamanouchi et al. ......... 438/375 |
| 5,273,356 A * | 12/1993 | Piccolo et al. ................ 366/84 |
| 5,719,218 A * | 2/1998 | Sarma ......................... 524/100 |
| 6,645,411 B1 * | 11/2003 | Danekas et al. ........ 264/171.15 |
| 6,797,200 B1 * | 9/2004 | Scelza et al. ................ 252/601 |
| 6,803,517 B1 * | 10/2004 | Caimi .......................... 174/36 |
| 6,828,022 B1 * | 12/2004 | Bisleri et al. ................ 428/375 |
| 6,830,777 B1 * | 12/2004 | Danekas et al. ............. 427/117 |
| 6,849,217 B1 * | 2/2005 | Peruzzotti et al. ...... 264/171.19 |
| 2002/0050389 A1 | 5/2002 | Danekas et al. |

FOREIGN PATENT DOCUMENTS

| | | |
|---|---|---|
| DE | 16 29 749 | 1/1971 |
| DE | 28 01 699 A1 | 7/1978 |
| DE | 28 13 585 A | 10/1978 |
| EP | 11 48 518 A1 | 10/2001 |
| EP | 11 76 161 A1 | 1/2002 |
| GB | 2166079 A * | 4/1986 |
| JP | 10-109351 | 4/1998 |

* cited by examiner

*Primary Examiner*—Mark Eashoo
(74) *Attorney, Agent, or Firm*—Sughrue Mion, PLLC

(57) ABSTRACT

A method of extruding a mixture made of a granulate, chips, or powder, etc. of a first thermoplastic and a second thermoplastic is described, the melting range of the first thermoplastic differing from the melting range of the second thermoplastic, using an extruder which has a heatable housing and a screw, which has an intake zone, a melting zone, a delivery zone, and a hole, extending from the intake zone up to the delivery zone, into which a temperature control media may be introduced, in which the temperature control medium causes heating of the screw in the intake zone to a temperature below the melting range of the thermoplastic having the lower melting range and temperature control of the screw in the delivery zone to a temperature which lies between the melting range of the first thermoplastic and the second thermoplastic.

10 Claims, 1 Drawing Sheet

METHOD OF EXTRUDING A MIXTURE

This application is based on and claims the benefit of German Patent Application No. 10252976.0 filed Nov. 14, 2002, which is incorporated by reference herein.

BACKGROUND OF THE INVENTION

The present invention relates to a method of extruding a mixture made of a first and a second thermoplastic.

A method of producing conducting wires coated with cross-linked polyethylene is known from European Patent Application 1 148 518, in which a mixture of granulate, chips, or powder made of a polyethylene homopolymer and a polyethylene copolymer is coated using a liquid cross-linking agent, the coated granulate, chips, or powder is melted in an extruder and extruded onto the conducting wire, and the extruded coating is cross-linked by heating to a temperature above the decomposition temperature of the cross-linking agent.

A method of extruding thermoplastically workable polymer plastics is known from British Patent 2 166 079. The function of an extruder is to melt and homogenize the thermoplastic material and to supply it under pressure at a uniform rate to an extrusion nozzle, using which the thermoplastic melt is brought into the desired shape. In the extrusion method, powder, granulate, or pellets of the thermoplastic are fed into the intake region of an extruder screw, which rotates inside a heated extruder housing. The thermoplastic material is transported by the rotation of the extruder screw inside the extruder housing in the direction toward the extrusion nozzle and is melted and homogenized at the same time. The melting and homogenization are performed in this case by supplying heat, which arises through the shear forces and is also introduced into the inside of the extruder by heating the extruder housing from the outside.

The delivery of an extruder is a function of, among other things, the geometric dimensions of the extruder screw and extruder housing, the rotation speed of the extruder screw, the properties of the thermoplastic, the geometric dimensions of the delivery zone and the extrusion nozzle, and the pressure applied in the region of the delivery zone.

In order to elevate the performance of an extruder having an extruder screw, it is suggested in British Patent 2 166 079 that the extruder screw be provided with a hole and an electrical heating element be inserted into the hole in order to heat the melt region of the extruder screw from the inside.

Problems arise during the extrusion of a mixture of two thermoplastics whose melting ranges are at different levels in that the granulate, powder, or pellets adhere to the surface of the screw in the intake region of the extruder screw when it is heated, and stable conveyance of the granulate, the powder, and the pellets is therefore no longer ensured.

In addition, the screw is heated in the region of the delivery zone by the heating from the outside, but particularly by the shear forces, to a temperature at which any additives which are admixed in order to improve the properties of the plastic already begin to react, which may be undesirable under certain circumstances.

SUMMARY OF THE INVENTION

The present invention is therefore based on the object of improving the method initially cited in that adhesion of the granulate, the powder, and/or the chips in the intake region of the extruder screw is prevented, and controlling the temperature of the melt in such a way that starting of the reaction of additives, in particular of peroxides, is avoided in the delivery region.

This object is achieved in that the extruder screw has a hole extending from the intake zone to the delivery zone into which a temperature control medium may be introduced, which causes heating of the extruder screw in the intake region to a temperature below the melting range of the thermoplastic having the lower melting range and temperature control of the screw in the delivery zone to a temperature which lies between the melting ranges of the first thermoplastic and the second thermoplastic.

In addition to the advantages resulting directly from the achievement of the object stated, the present invention also allows a high processing reliability and a high manufacturing speed to be achieved.

Further advantageous embodiments of the present invention are described in the subclaims.

BRIEF DESCRIPTION OF THE DRAWING

The present invention is described in greater detail on the basis of the exemplary embodiments schematically illustrated in FIGS. 1 and 2.

A side view of an extruder is shown in FIG. 1.
A section through the extruder screw is shown in FIG. 2.

DETAILED DESCRIPTION OF THE INVENTION

Figure 1:
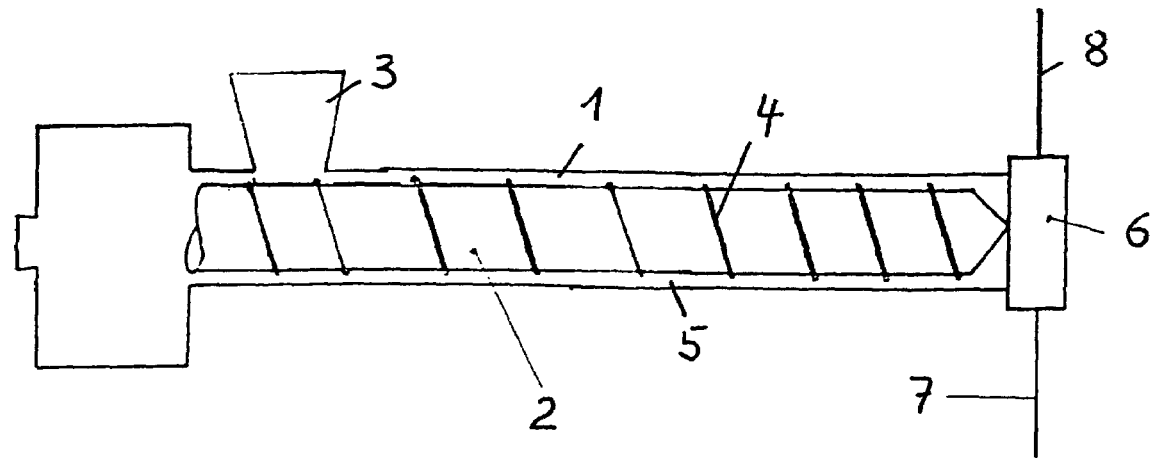
Figure 2:
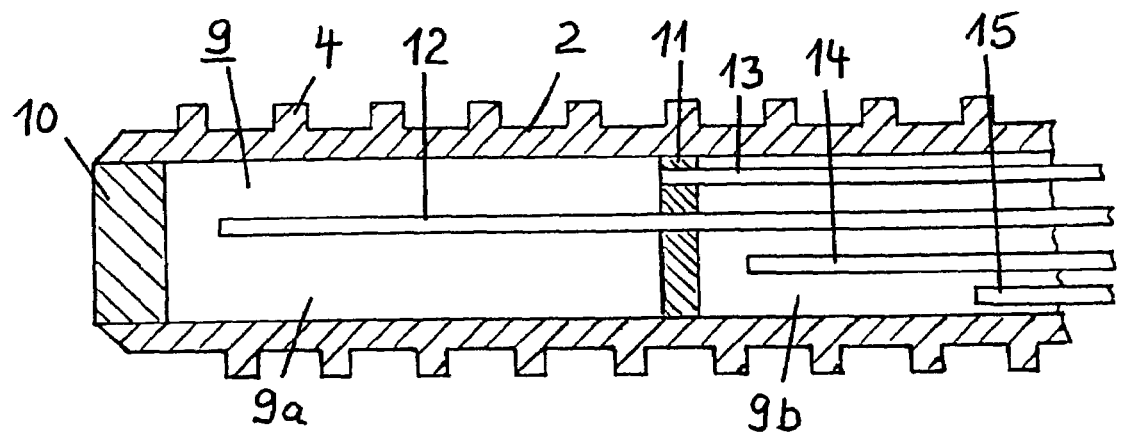

The extruder has an extruder housing 1 in which a screw 2 is mounted so it may be driven to rotate. The extruder is provided with an additional auxiliary heater (not shown), which is housed in the extruder housing. A funnel 3 is used for pouring in the granulate, chips, or pellets made of the thermoplastics to be processed. The material introduced into the funnel 3 is transported further by the screw threads 4 in the gap 5 between the extruder housing 1 and the extruder screw 2—to the right in FIG. 1 while being melted and homogenized. An angular extruder head 6 is provided at the outlet end of the extruder, with the aid of which a plastic coating 8 is applied to an electrical conductor 7.

The extruder screw 2 has a cavity and/or hole 9 which is closed at one end 10. The hole 9 is divided into two regions 9a and 9b by a partition wall 11. A pipeline 12 is guided liquid-tight through the partition wall 11 and ends before the end 10 of the hole 9. A second pipeline 13 is also guided liquid-tight through the partition wall 11.

Two further pipelines 14 and 15 are guided into the region 9b of the hole 9 from the end of the screw 2 diametrically opposite to the end 10, the pipeline 14 being longer than the pipeline 15.

A temperature control medium—normally water—is introduced from a temperature control device (not shown) into the region 9a through the pipeline 12, where it ensures a uniform temperature on the surface of the screw 2.

The pipeline 13 returns the temperature control medium to the temperature control device.

The pipeline 14 is also connected to a temperature control device (not shown) and also conducts a temperature control medium—normally water—into the region 9b. The pipeline 15 returns the temperature control medium to the temperature control device.

Through the temperature control media, the surface of the extruder screw 2 is kept at different temperatures and the surface temperature is significantly higher in the region 9a than in the region 9b.

The mode of operation of the extruder and/or of the screw is to be clarified on the basis of an exemplary embodiment. To produce the insulation of an electrical conductor, a mixture is mixed from 80 parts LDPE having a density of approximately 0.92 g/cc and 20 parts polyethylene copolymer, e.g., ethylene butyl acrylate, together with 2 parts dicumyl peroxide or tert. butyl cumyl peroxide and 0.2 parts stabilizer, and poured into the funnel 3 of the extruder. The mixture may be preheated to a temperature of 40–60° C. before being introduced.

The surface temperature of the screw 2 is set to a temperature of approximately 50° C. in the region 9*b*.

By supplying heat via the inner wall of the heated extruder housing 1 and through the shear forces arising during the rotation of the screw 2, the granulate is gradually melted and homogenized. In order to avoid overheating of the melt and prevent reaction of the peroxide, the surface temperature of the screw 2 in the region

9*a* (delivery zone) is set to a temperature which is between the melting ranges of the polyethylene copolymer and the LDPE. It is between approximately 95 and 105° C.

The melt introduced at the end of the extruder into the angular extruder head 6 has a temperature of approximately 120° C.

The electric conductor 8 provided with the insulation coating 7 is subsequently introduced into a CV tube, where the cross-linking of the insulation coating 8 is performed at a temperature above the decomposition temperature of the peroxide.

What is claimed is:

1. A method of extruding a mixture of particles of a first thermoplastic and a second thermoplastic, the melting range of the first thermoplastic differing from the melting range of the second thermoplastic, using an extruder which has a heatable housing and a screw, which has an intake zone, a melting zone, a delivery zone, and a hole, extending from the intake zone up to the delivery zone, into which a temperature control medium may be introduced, said method comprising the steps of:

introducing said particle mixture into said extruder;
   advancing said mixture through said intake, heating and delivery zones by rotation of said screw; and
   introducing said temperature control medium into said hole;
   wherein the temperature control medium causes heating of the screw in the intake zone to a temperature below the melting range of the thermoplastic having the lower melting range and causes temperature control of the screw in the delivery zone to a temperature which lies between the melting ranges of the first thermoplastic and the second thermoplastic.

2. The method according to claim 1, characterized in that the first thermoplastic is a polyethylene homopolymer and the second thermoplastic is a copolymer of ethylene.

3. The method according to claim 2, characterized in that an ethylene butyl acrylate (EBA), an ethylene ethyl acrylate (EEA), or an ethylene methyl acrylate (EMA), each having an acrylate monomer content of 8 to 35 weight-percent, is used as the copolymer of ethylene.

4. The method according to claim 1, characterized in that the screw is heated to a temperature between 20 and 60° C. in the intake zone.

5. The method according to claim 1, characterized in that the screw is kept at a temperature of 95 to 110° C. in the region of the delivery zone.

6. The method according to claim 1, characterized in that a mixture made of 70–90 weight-percent polyethylene homopolymer and 30–10 weight-percent copolymer of ethylene is mixed, melted, and extruded in the extruder.

7. The method according to claim 1, characterized in that a copolymer of ethylene is used whose comonomer component is between 8 and 35%.

8. The method according to claim 1, characterized in that both thermoplastics are poured into the extruder in granulated form.

9. The method according to claim 1, characterized in that the hole of the screw is divided into two chambers, the first chamber extending from the intake zone up to the first third of the melting zone, and the second chamber extending up into the delivery zone, and wherein the temperature control medium for the first chamber is temperature controlled to a preselectable temperature in a first temperature control device and the temperature control medium for the second chamber is temperature controlled to a preselectable temperature in a second temperature control device.

10. The method according to claim 9, characterized in that the polymer mixture contains a peroxide component of 1 to 3 weight-percent.

* * * * *